United States Patent
Jeon

(10) Patent No.: US 6,732,037 B2
(45) Date of Patent: May 4, 2004

(54) METHOD AND SYSTEM FOR DETERMINING FILL TIME FOR FRICTION ELEMENTS OF AUTOMATIC TRANSMISSION

(75) Inventor: Byeong-Wook Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 18 days.

(21) Appl. No.: 10/028,210

(22) Filed: Dec. 21, 2001

(65) Prior Publication Data

US 2002/0120381 A1 Aug. 29, 2002

(30) Foreign Application Priority Data

Dec. 27, 2000 (KR) ......................................... 2000-82949

(51) Int. Cl.⁷ .............................................. G06F 17/00
(52) U.S. Cl. ............................ 701/51; 701/55; 701/66; 701/67
(58) Field of Search ............................ 701/51, 55, 56, 701/61, 62, 66, 67, 68; 477/117, 143, 150, 168; 192/109 F, 85 R, 87.13, 87.18, 87.12; 475/116, 128, 123, 143; 74/733.1, 335, 730.1, 731.1, 732.1

(56) References Cited

U.S. PATENT DOCUMENTS

| | | | |
|---|---|---|---|
| 4,387,731 A | * | 6/1983 | Chatterjea ............... 137/115.13 |
| 5,216,606 A | * | 6/1993 | Lentz et al. ................... 701/66 |
| 5,551,930 A | * | 9/1996 | Creger et al. ................. 477/130 |
| 5,580,332 A | * | 12/1996 | Mitchell et al. ............. 477/143 |
| 5,853,076 A | * | 12/1998 | McKee et al. ............ 192/87.14 |
| 5,902,344 A | * | 5/1999 | Eike et al. ...................... 701/67 |
| 6,285,942 B1 | * | 9/2001 | Steinmetz et al. ............. 701/67 |
| 6,292,732 B1 | * | 9/2001 | Steinmetz et al. ............. 701/67 |

* cited by examiner

*Primary Examiner*—Jacques H. Louis-Jacques
(74) *Attorney, Agent, or Firm*—Morgan Lewis & Bockius LLP

(57) ABSTRACT

In order to more precisely calculate a fill time of a friction element of an automatic transmission that is either engaged or disengaged during shifting between an N-range, a D-range, and an R-range, this invention compensates a piston stroke ratio by detecting an N-range hold time and by using the N-range hold time and a pre-installed map when a shift signal indicating shifting into one of the D-and R-ranges from an N-range is detected, compensates the piston stroke ratio by detecting a D/R-range hold time and by using the D/R-range hold time and the pre-installed map when a shift signal indicating shifting into the N-range from one of the D- and R-ranges is detected, and calculates a fill time using the compensated piston stroke ratio.

16 Claims, 3 Drawing Sheets

METHOD AND SYSTEM FOR DETERMINING FILL TIME FOR FRICTION ELEMENTS OF AUTOMATIC TRANSMISSION

BACKGROUND OF THE INVENTION

The present invention relates to an automatic transmission, and more particularly, to a method and system for determining a fill time for friction elements of an automatic transmission.

In automatic transmissions used for vehicles, a shift control system controls the automatic shifting between different speeds and shift ranges according to various factors including throttle opening, vehicle speed, and load, and various engine and driving conditions detected through a plurality of sensors. That is, based on such factors, the shift control system controls a plurality of solenoid valves in a hydraulic control system such that the hydraulic flow controls the shifting of the transmission into the various shift ranges and speeds within the ranges (where applicable).

More specifically, when the driver manipulates a shift lever to a desired shift range, a manual valve of the hydraulic control system undergoes port conversion as a result of the manual valve being indexed with the shift lever. By this operation, hydraulic pressure generated by a hydraulic pump (i.e., the hydraulic pump generates hydraulic flow that results in hydraulic pressure) selectively engages a plurality of operational elements of a gearshift mechanism according to the duty control of the solenoid valves, thereby realizing shifting to the desired shift range.

The automatic transmission operating as above includes friction elements, which, when shifting to the desired shift range, are converted from an engaged to a disengaged state and from a disengaged to an engaged state.

Such friction elements typically include metal bands and/or clutches for controlling the planetary gears in the transmission. The friction elements are actuated by hydraulic pistons and the references to fill time as used herein are to the time for filling/actuating the hydraulic pistons that, in turn, engage the friction elements. After control signals for the supply of hydraulic pressure to the friction elements are input to the solenoid valves, control is performed and hydraulic pressure passes through predetermined lines for supply to the friction elements. The time from the instant the control signals are transmitted to the moment the friction elements are fully engaged is referred to as the fill time. Fill time can also be thought of as the time required for the friction elements to change from a disengaged to an engaged state following the application of a control signal (since the transmission time for the signal can be considered instantaneous).

Since the friction elements must engage at a precise moment, the application of the control signals must precede the time interval needed to engage the friction elements and extend back over the fill time. Hence, the determination of the fill time is a factor in realizing precise control of the automatic transmission.

In the case where automatic shifting is performed between different speeds in the D-range (e.g., first through fourth speeds), established standard fill times for specific friction elements may be called from a memory by a transmission control unit. The timing at which the solenoid valves are driven is determined from the established standard fill times.

There are instances, however, when the select lever is changed many times between the drive range (D-range), neutral range (N-range), and the reverse range (R-range) in a short interval (for example when parallel parking). During such operation, the select lever may be re-positioned before the full engagement or disengagement of the friction elements takes place. Therefore, it becomes necessary for the fill times of the friction elements to be determined in real-time every instance the select lever is manipulated into a different position.

In one prior art method for determining the fill times of the friction elements, modeling of the exhaust and supply of hydraulic pressure during shifting between the D-, N-, and R-ranges is not based on the actual stroke of the pistons driving the friction elements, but rather on linear equations that do not accurately describe the action of the pistons. Accordingly, if shifting is performed during the exhaust or supply of hydraulic pressure, errors result in the determination of the strokes of the pistons that drive the friction elements, which are engaged and disengaged during the shift operation.

As a result of such errors in the determination of the piston stroke ratios, precise fill time values cannot be determined during relatively quick, successive shifting between the D-, N-, and R-ranges. Hence, the friction elements are not driven at precise times such that shift quality varies and shift shock may occur.

SUMMARY OF THE INVENTION

The present invention provides a method and system for determining a fill time of friction elements of an automatic transmission, in which, in the case where a select lever is successively operated between a D-range, an N-range, and a R-range over a short interval, a stroke ratio of pistons driving the friction elements is calculated and a fill time of the friction elements is determined based on this calculation.

According to one embodiment of the invention, a friction element of an automatic transmission is either engaged or disengaged during shifting between an N-range, a D-range, and an R-range. The method comprises neutral compensating, in which a piston stroke ratio is compensated by detecting an N-range hold time and using the detected N-range hold time and a pre-installed map when an N to D/R shift signal (indicating shifting into one of the D- and R-ranges from the N-range) is detected; drive compensating, in which a piston stroke ratio is compensated by detecting a D/R-range hold time and using the detected D/R-range hold time and the pre-installed map when a D/R to N shift signal (indicating shifting into the N-range from one of the D- and R-ranges) is detected, the D/R-range hold time being the time during which the shift range is held at said one of the D- and R-ranges; and calculating a fill time using the compensated piston stroke ratio.

According to a preferred embodiment of the present invention, the neutral compensating comprises determining if the N to D/R shift signal is detected; initializing, in the case where the N to D/R shift signal is detected, a timing device after the N-range hold time is detected; calculating a change in an N to D/R piston stroke ratio from the pre-installed map using the N-range hold time; and compensating the piston stroke ratio based on the change in the N to D/R piston stroke ratio.

In another preferred embodiment of the present invention, the piston stroke ratio is compensated by adding the change in the N to D/R piston stroke ratio to the piston stroke ratio.

According to yet another embodiment of the present invention, the drive compensating comprises determining if the D/R to N shift signal is detected; initializing, in the case where the D/R to N shift signal is detected, a timing device after the D/R-range hold time is detected; calculating a change in a D/R to N piston stroke ration from the pre-installed map using the D/R-range hold time; and compensating the piston stroke ratio based on the change in the D/R to N piston stroke ratio. Preferably, the piston stroke ratio is compensated for by adding the change in the D/R to N piston stroke ratio to the piston stroke ratio.

In a further alternative embodiment of the present invention, the method further comprises detecting a compensation start signal of the piston stroke ratio; initializing the piston stroke ratio and a timing device; repeating the neutral compensating, drive compensating, and calculating the fill time until shifting occurs into a shift range other than the R-, N-, and D-ranges. The compensation start signal for the piston stroke ratio is a D/R to N shift signal indicating shifting into the N-range from one of the D-range and the R-range. Initialization of the timing device is such that the timing device is initialized to 0, and initialization of the piston stroke ratio is such that the piston stroke ratio is initialized to 1 in the case of a friction element that is disengaged during shifting into the N-range and to 0 in the case of a friction element that is engaged during shifting into the N-range.

Preferably, the fill time may be calculated using the equation "fill time=(1−St)*Tb", where St is the piston stroke ratio and Tb is a predetermined standard fill time. Moreover, preferably the fill time is calculated based on the piston stroke ratio and using an inverse map of the pre-installed map.

The system for determining a fill time of a friction element of an automatic transmission comprises a shift lever detector for detecting a position of a shift lever, which is operated by a driver, and outputting a corresponding shift lever change signal; a timing device for measuring time intervals between a change in position of the shift lever, and outputting a corresponding time signal; and an electronic control unit for calculating a friction element fill time when the shift lever change signal is input in which the friction element fill time is calculated based on a piston stroke ratio of a piston that drives a friction element. The electronic control unit (ECU) compensates the piston stroke ratio by detecting an N-range hold time and by using the detected N-range hold time and a pre-installed map when an N to D/R shift signal, indicating shifting into one of the D- and R-ranges from the N-range, is detected. The ECU also compensates the piston stroke ratio by detecting a D/R-range hold time and using the detected D/R-range hold time and the pre-installed map when a D/R to N shift signal, indicating shifting into the N-range from one of the D- and R-ranges, is detected. The D/R-range hold time is the time during which the shift range is held at said one of the D- and R-ranges. The ECU then calculates a fill time using the compensated piston stroke ratio.

According to the present invention, when it is determined if the N to D/R shift signal has been detected, the timing device is initialized after the N-range hold time is detected, in the case where the N to D/R shift signal is detected. A change in the N to D/R piston stroke ratio is calculated from the pre-installed map using the N-range hold time and the piston stroke ratio is compensated based on the change in the N to D/R piston stroke ratio. Alternatively, when it is determined if the D/R to N shift signal has been detected, the timing device is initialized after the D/R-range hold time is detected, in the case where the D/R to N shift signal is detected. A change in the D/R to N piston stroke ratio is calculated from the pre-installed map using the D/R-range hold time and the piston stroke ratio is compensated based on the change in the D/R to N piston stroke ratio.

Preferably, the processes of detecting a shift signal, compensating the piston stroke ratio, and calculating the fill time are repeated until shifting occurs into a shift range other than the R-, N-, and D-ranges.

In a further preferred embodiment, the fill time is calculated using the equation "fill time=(1−St)*Tb", where St is the piston stroke ratio and Tb is a predetermined standard fill time. The fill time also may be calculated based on the piston stroke ratio and using an inverse map of the pre-installed map.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
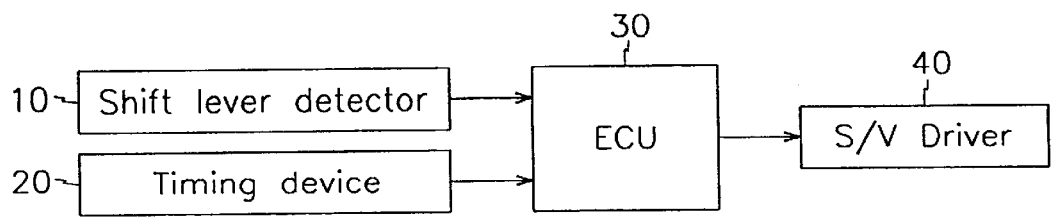
FIG. 1 is a block diagram of a system for determining a fill time for friction elements of an automatic transmission according to a preferred embodiment of the present invention.

As illustrated generally in FIG. 1, a system according to the invention includes a shift lever detector 10, a timing device 20, an electronic control unit (ECU) 30, and a driver 40. In an automatic transmission, hydraulic pressure is supplied to or exhausted from specific friction elements by driving a plurality of solenoid valves. Driver 40 includes such solenoid valves.

The shift lever detector 10 detects the position of the transmission shift lever, which is operated by the driver, and outputs corresponding signals to the ECU 30. The timing device 20 measures a hold time starting from the moment shifting is realized until subsequent shifting takes place, that is, the time that a shift range is maintained. The hold time measured by the timing device 20, therefore, is the time that the drive range (D-range), reverse range (R-range), and/or neutral range (N-range) are maintained.

The ECU 30 receives signals output by the shift lever detector 10 and the timing device 20 to determine a piston stroke ratio, calculates a corresponding fill time, and outputs control signals to the driver 40. The control signals may be duty control signals in the case where the solenoid valves of the driver 40 are duty solenoid valves.

The ECU 30 may be a microprocessor that operates according to an installed program, that is, a program that performs a method for determining a fill time according to a preferred embodiment of the present invention (to be described hereinafter). The timing device 20 may be a clock or other incremental counter provided in the ECU 30.

A stroke map is stored in the ECU 30, for determining a piston stroke ratio that corresponds to times at which an apply-stroke and a release-stroke have been maintained in an applied and released state, respectively. The stroke map may be understood from the characteristics of changes in stroke shown in FIGS. 2A and 2B.

Figure 2A:
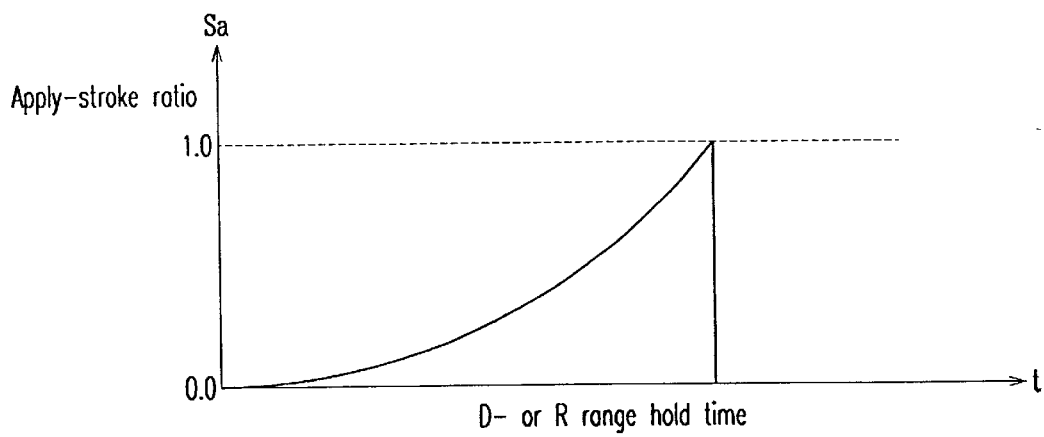
FIGS. 2A and 2B show examples of a apply-stroke ratio graph and a release-stroke ratio graph for friction elements applied according to a preferred embodiment of the present invention.
Figure 2B:
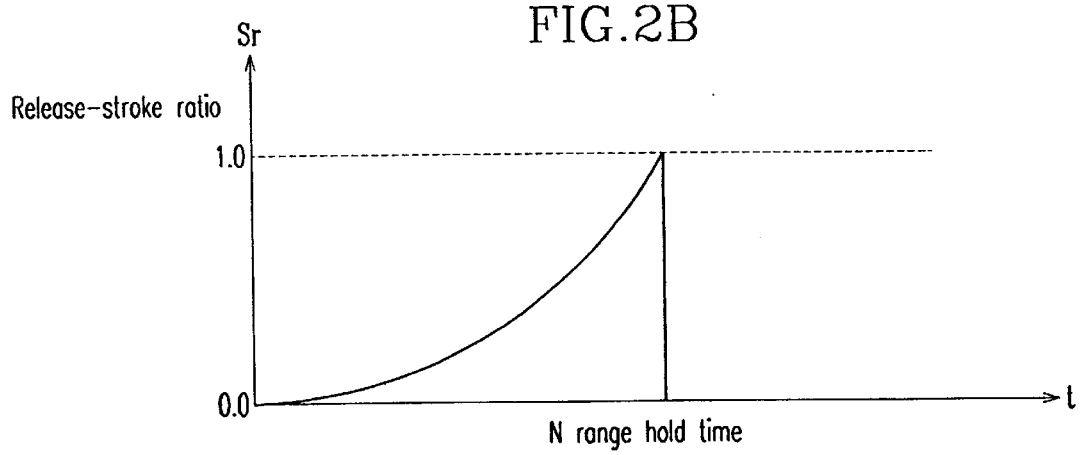

In FIGS. 2A and 2B, graphs are shown of an apply-stroke ratio Sa in the case where hydraulic pressure is supplied, and of a release-stroke ratio Sr in the case where hydraulic pressure is exhausted. The changes in the apply-stroke ratio Sa and of the release-stroke ratio Sr are shown with respect to time. FIG. 2A illustrates the case of friction element engagement in the D- or R-range, and FIG. 2B illustrates the case of friction element disengagement in the N-range.

If hydraulic pressure is supplied to operate a piston for driving a friction element, displacement of the piston starting from when hydraulic pressure is first supplied, that is, the apply-stroke ratio Sa, is not directly proportional to time. The non-linear relationship between the apply-stroke ratio Sa and time is clearly shown in FIG. 2A. In FIG. 2A, the apply-stroke ratio Sa reaching a value of 1.0 indicates that the piston is maximally displaced and the friction element is fully engaged.

Similarly, if hydraulic pressure is released from a piston to disengage a friction element, displacement of the piston starting from when hydraulic pressure is first released, that is, the release-stroke ratio Sr, is not directly proportional to time. The non-linear relationship between the release-stroke ratio Sr and time is clearly shown in FIG. 2B. In FIG. 2B, a release-stroke ratio Sr of 0.0 indicates full engagement of the friction element, whereas a release-stroke ratio Sr of 1.0 indicates a maximum distance of the piston from the friction element, therefore complete disengagement of the friction element.

The relationship between the apply-stroke ratio Sa and the release-stroke ratio Sr is as follows. Following the start of disengagement of the piston that drives a specific friction element from an apply-stroke ratio Sa of 1.0, at the point where the release-stroke ratio Sr reaches a value of 0.7, the apply-stroke ratio Sa is at a value of 0.3. Thus, the apply-stroke ratio Sa and release-stroke ratio Sr are inversely proportional.

As shown in FIGS. 2A and 2B, the lines indicating the apply-stroke ratio Sa and the release-stroke ratio Sr with respect to time are curved, not linear. Examples of mapping of the apply-stroke ratio Sa and the release-stroke ratio Sr for a friction element engaged in the D- and R-ranges and disengaged in the N-range with respect to time are shown in the following tables.

TABLE 1

| N to D shifting | | | | | | |
|---|---|---|---|---|---|---|
| D maintenance time (msec) | 0 | 250 | 500 | 1000 | 1500 | 2000 |
| Piston stroke ratio (Sa) | 0.0 | 0.2 | 0.5 | 0.7 | 0.85 | 1.0 |

TABLE 2

| N to R shifting | | | | | | |
|---|---|---|---|---|---|---|
| R maintenance time (msec) | 0 | 250 | 500 | 1000 | 1500 | 2000 |
| Piston stroke ratio (Sa) | 0.0 | 0.25 | 0.4 | 0.75 | 0.9 | 1.0 |

TABLE 3

| D to N shifting | | | | | | |
|---|---|---|---|---|---|---|
| N maintenance time (msec) | 0 | 250 | 500 | 1000 | 1500 | 2000 |
| Piston stroke ratio (Sr) | 0.0 | 0.3 | 0.6 | 0.7 | 0.85 | 1.0 |

TABLE 4

| R to N shifting | | | | | | |
|---|---|---|---|---|---|---|
| N maintenance time (msec) | 0 | 250 | 500 | 1000 | 1500 | 2000 |
| Piston stroke ratio (Sa) | 0.0 | 0.1 | 0.3 | 0.8 | 0.95 | 1.0 |

It is to be understood that Tables 1–4 show values for a specific friction element when hydraulic pressure is supplied thereto and released therefrom. Therefore, the values contained in the tables may be different for different friction elements. Also, since the values for a friction element that is engaged in the D- and R-ranges and disengaged in the N-range are shown in Tables 1–4, for a friction element that is engaged in the N-range and disengaged in the D- and R-ranges, the values in the tables remain applicable by switching the apply-stroke ratio Sa for the release-stroke ratio Sr.

Further, it is to be understood that since the release-stroke ratio Sr is shown to increase with the passage of time as the piston is disengaged, and the apply-stroke ratio Sa is shown to increase with the passage of time as the piston is engaged, the release-stroke ratio Sr is the negative of the apply-stroke ratio Sa and the apply-stroke ratio Sa is the negative of the release-stroke ratio Sr.

Tables 1–4 will be referred to as a stroke map hereinafter.

Figure 3:
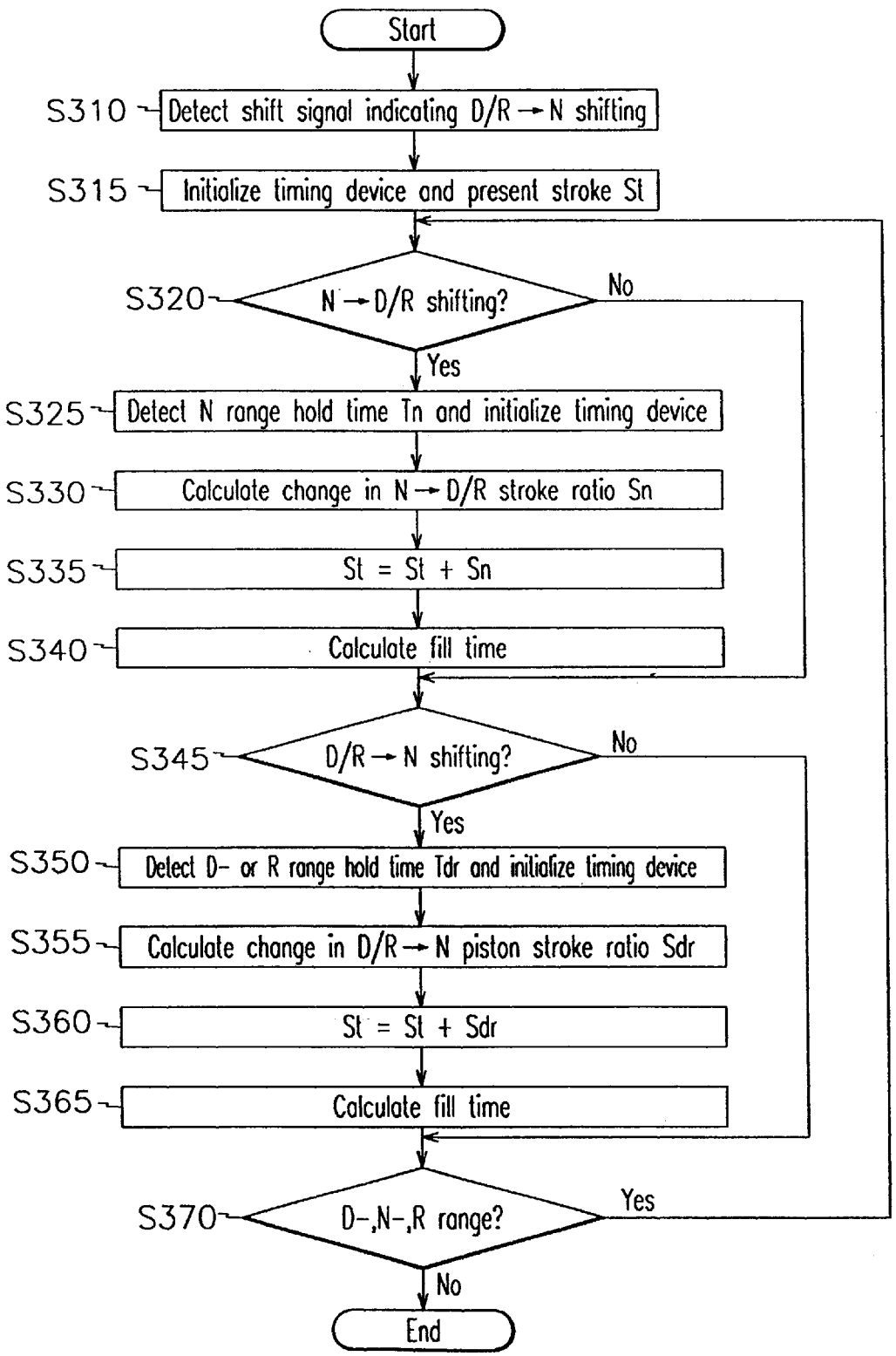
FIG. 3 is a flow chart of a method for determining a fill time for friction elements of an automatic transmission according to a preferred embodiment of the present invention.

A method for determining a fill time of friction elements of an automatic transmission according to a preferred embodiment of the present invention will now be described with reference to FIG. 3.

A shift signal indicating shifting from the D-range or R-range into the N-range is detected in step S310. Accordingly, the timing device 20 and a present stroke ratio St of a piston for a specific friction element are initialized in step S315. That is, the timing device 20 is initialized to 0.0, while the present stroke ratio St of a friction element to be disengaged during shifting into the N-range is set to 1.0 and the present stroke ratio St of a friction element to be engaged during shifting into the N-range is set to 0.0. Hence, the present stroke ratio St is essentially an apply-stroke ratio.

Next, the following two strings of steps are repeated by operation of step S370 until shifting is performed into a shift range other than the R-, N-, and D-ranges:

(1) In the case where shifting is performed into either the D-range or R-range from the N-range (i.e., a shift signal of such shifting is detected), the time at which the N-range has been maintained (N-range hold time Tn) is detected, and the present stroke ratio St is compensated for using a pre-installed map and the N-range hold time Tn in steps S320, S325, S330, and S335.

(2) In the case where shifting is performed into the N-range from either the D-range or the R-range (i.e., a shift signal of such shifting is detected), the time at which the D- or R-range has been maintained (D- or R-range hold time Tdr) is detected, and the present stroke ratio St is compensated for using a pre-installed map and either the D-range hold time or R-range hold time in steps S345, S350, S355, and S360.

Subsequently, in each case a fill time is calculated based on the compensated present stroke ratio St of either step S335 or step S360. In one preferred embodiment of the present invention, the pre-installed map may be the stroke map of Tables 1–4 above.

The steps involved in the compensation of the present stroke ratio St based on the N-range hold time Tn will be described in more detail. First, it is determined if an N to D/R shift signal is detected in step S320, that is, whether a shift signal indicating shifting into either the D-range or the R-range from the N-range is detected. If an N to D/R shift signal is not detected, compensation of the present stroke ratio St of a piston based on the N-range hold time Tn is discontinued and the remaining steps in this process are skipped.

However, if an N to D/R shift signal is detected, the N-range hold time Tn is detected and the timing device 20 is initialized in step S325. Subsequently, a change in N to D/R piston stroke ratio Sn is calculated using the N-range hold time Tn and the pre-installed map in step S330. The change in N to D/R piston stroke ratio Sn may be calculated by extracting a change in N to D/R piston stroke ratio Sn corresponding to the N-range hold time Tn in the pre-installed map, or by interpolation using an adjacent map value in the case where there is no map value directly corresponding to the detected N-range hold time Tn. Since the present stroke ratio St is calculated based on an apply-stroke ratio, values calculated for the change in N to D/R piston stroke ratio Sn are negative in the case where the friction element is being disengaged in the N-range and positive if the friction element is being engaged.

After calculation of the change in N to D/R piston stroke ratio Sn, the present stroke ratio St is compensated for based on the calculated change in N to D/R piston stroke ratio Sn in step S335. The present stroke ratio St is compensated for by adding the change in N to D/R piston stroke ratio Sn to the present stroke ratio St.

The steps involved in the compensation of the present stroke ratio St using the D- or R-range hold time Tdr will now be described in more detail. First, it is determined if a D/R to N shift signal is detected in step S345, that is, whether a shift signal indicating shifting into the N-range from either the D-range or the R-range is detected. If a D/R to N shift signal is not detected, compensation of the present stroke ratio St of a piston based on the D- or R-range hold time Tdr is discontinued and the remaining steps in this process are skipped.

However, if a D/R to N shift signal is detected, the D- or R-range hold time Tdr is detected and the timing device 20 is initialized in step S350. Subsequently, a change in D/R to N piston stroke ratio Sdr is calculated using the D- or R-range hold time Tdr and the pre-installed map in step S355. The change in D/R to N piston stroke ratio Sdr may be calculated by extracting a change in D/R to N piston stroke ratio Sdr corresponding to the D- or R-range hold time Tdr in the pre-installed map, or by interpolation using an adjacent map value in the case where there is no map value directly corresponding to the detected D- or R-range hold time Tdr. Since the present stroke ratio St is calculated based on an apply-stroke ratio, values calculated for the change in D/R to N piston stroke ratio Sdr are negative in the case where the friction element is being disengaged in the D- or R-range and positive if the friction element is being engaged.

After calculation of the change in D/R to N piston stroke ratio Sdr, the present stroke ratio St is compensated for based on the calculated change in D/R to N piston stroke ratio Sdr in step S360. The present stroke ratio St is compensated for by adding the change in D/R to N piston stroke ratio Sdr to the present stroke ratio St.

The fill time calculations of steps S340 and S365, in which the present stroke ratio St is used, may be performed with, for example, the equation $(1-St)*Tb$, where Tb is a standard fill time for all piston stroke ratios in changing from a value of 0.0 to a value of 1.0. Preferably, calculation of the fill time is performed by obtaining a time corresponding to the present stroke ratio St from an inverse map of the pre-installed map, then subtracting this time from the standard fill time Tb. The non-linear time dependency of the piston stroke ratios Sa and Sr is fully accounted for with such a calculation using an inverse map.

Figures 4A, 4B:
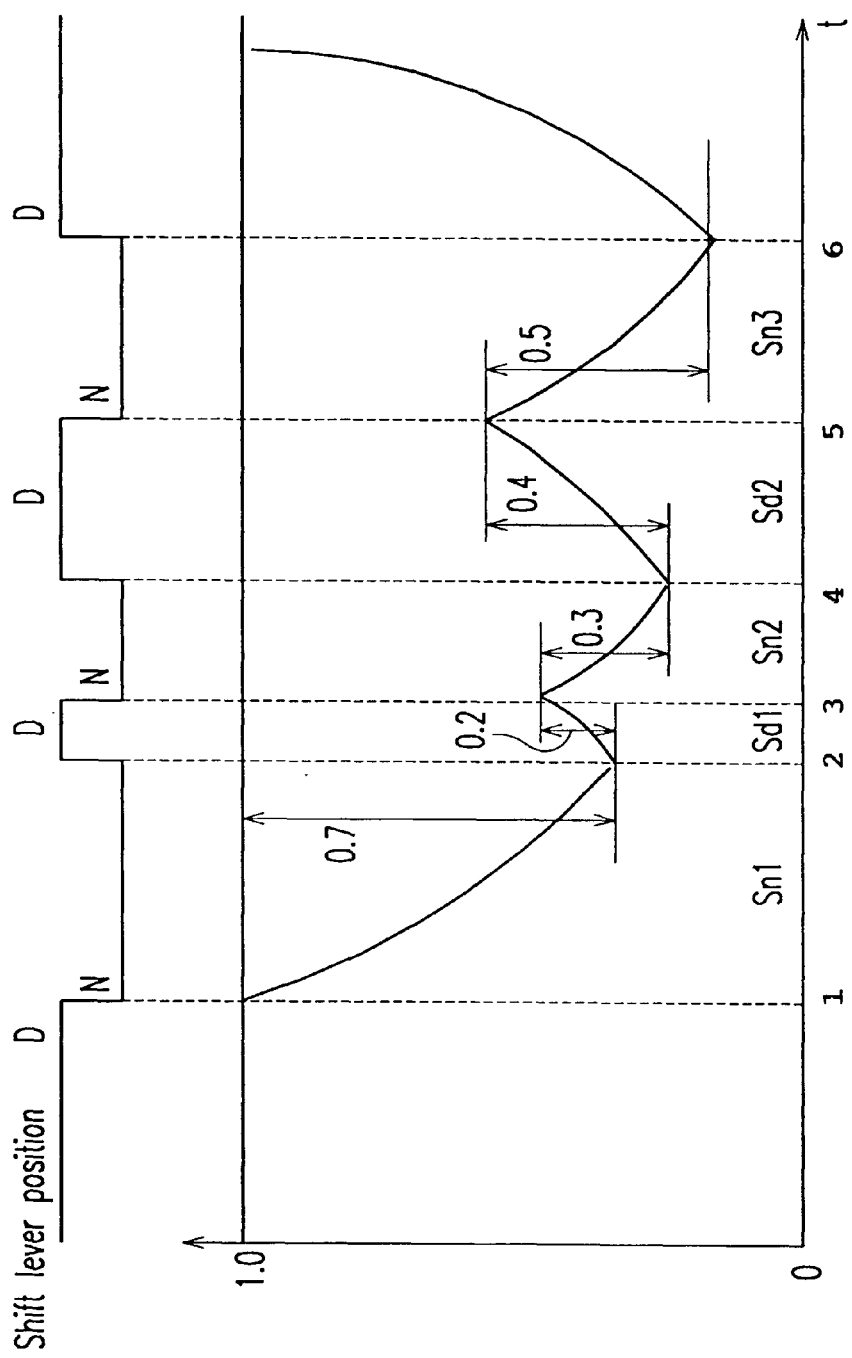
FIG. 4A is a graph of a D-range to N-range shift pattern and FIG. 4B is a corresponding piston stroke ratio used to describe the operation of a method according to a preferred embodiment of the present invention.

The processes involved in the method according to a preferred embodiment of the present invention, in the case where a shift signal as shown in FIG. 4A is input, will now be described in detail. In FIG. 4A, shift signals are generated corresponding to successive shifting between the D- and N-ranges, that is, shifting as follows: D to N to D to N to D to N to D. The points at which each shift signal is generated are indicated by the numbers 1–6 of FIG. 4B, which shows changes in the apply-stroke ratio with respect to the friction element disengaged in the N-range.

(1) The initial D to N shift signal is detected by the ECU 30 in step S310, after which the timing device 20 and the present stroke ratio St are initialized in step S315. As a result of the initial D to N shift signal, the ECU 30 operates the driver 40 such that the stroke ratio of the piston for the specific friction element is reduced from 1.0.

(2) Next, if an N to D shift signal is generated following the generation of the initial D to N shift signal but before the piston stroke ratio is fully reduced, this is detected by the ECU 30 in step S320. Accordingly, the ECU 30 detects the N-range hold time Tn at which the N-range has been maintained in step S325, then calculates the change in piston stroke ratio Sn from the pre-installed map based on the N-range hold time Tn in step S330. In FIG. 4B, the change in piston stroke ratio Sn generated between points (1) and (2) is −0.7, the negative sign indicating a reduction in the piston stroke ratio.

Next, the present stroke ratio St is compensated using the calculated change in piston stroke ratio Sn. That is, the change in piston stroke ratio Sn is added to the present stroke ratio St. After the present stroke ratio St is compensated for, the fill time when the shift signal is detected is calculated using the compensated present stroke ratio St in step S340. The fill time may be calculated using a specific formula or with the aid of an inverse map as described above. The driver 40 is then operated using the precisely calculated fill time, thereby enhancing shift feel.

(3) If a shift signal for shifting again into neutral is generated during the shift control into the D-range after point (2), the D to N shift signal is detected by the ECU 30 in step S345. Accordingly, the ECU 30 detects the D-range hold time Tdr during which the D-range has been maintained in step S350, then calculates the change in piston stroke ratio Sdr from the pre-installed map based on the D-range hold time Tdr in step S355. Next, the present stroke ratio St is compensated for using the calculated change in piston stroke ratio Sdr, after which the fill time is calculated using the compensated present stroke ratio St in step S365.

The calculation of the fill times for the subsequent points when a shift signal is detected at (4), (5), and (6) is performed by the ECU 30 identically as described above.

In FIGS. 4A and 4B, although the case where shifting is performed in succession between the D- and N-ranges was described, the operations involved when shifting repeatedly between other shift ranges such as between the R- and N-ranges may also be clearly understood from the above description.

In a preferred embodiment of the present invention, the piston stroke ratio is calculated by performing compensation of the same when successive shifting between the N-, D-, and R-ranges takes place over a short interval. As a result, fill times at every instance a shift signal is generated may be precisely determined.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for determining, using a piston stroke ratio of a piston, a fill time for a friction element in an automatic transmission that is either engaged or disengaged during shifting between an N-range, a D-range, and an R-range, the friction element being actuated by the piston, the method comprising:

neutral compensating for the piston stroke ratio of said piston, wherein said neutral compensating comprises detecting an N-range hold time and compensating for the piston stroke ratio using the detected N-range hold time and a pre-installed map when a N to D/R shift signal is detected to determine a neutral compensated piston ratio;

drive compensating for the piston stroke ratio of said piston, wherein said drive compensating comprises detecting a D/R-range hold time and compensating for the piston stroke ratio using the detected D/R-range hold time and the pre-installed map when a D/R to N shift signal is detected, the D/R-range to hold time being a time during which the shift range is held at said one of the D- and R-ranges, to determine a drive compensated piston ratio; and calculating a fill time using the compensated piston stroke ratio;

said neutral compensating further comprising, detecting the N to D/R shift signal, initializing, in the case where the N to D/R shift signal is detected, a timing device after the N-range hold time is detected calculating a change in an N to D/R piston stroke ratio from the pre-installed map using the N-range hold time; and compensating the piston stroke ratio based on the change in the N to D/R piston stroke ratio.

2. The method of claim 1, wherein the piston stroke ratio is compensated by adding the change in the N to D/R piston stroke ratio to the piston stroke ratio.

3. A method for determining, using a piston stroke ratio of a piston, a fill time for a friction element in an automatic transmission that is either engaged or disengaged during shifting between an N-range, a D-range, and an R-range, the friction element being actuated by the piston, the method comprising:

neutral compensating for the piston stroke ratio of said piston, wherein said neutral compensating comprises detecting an N-range hold time and compensating for the piston stroke ratio using the detected N-range hold time and a pre-installed map when a N to D/R shift signal is detected to determine a neutral compensated piston ratio;

drive compensating for the piston stroke ratio of said piston, wherein said drive compensating comprises detecting a D/R-range hold time and compensating for the piston stroke ratio using the detected D/R-range hold time and the pre-installed map when a D/R to N shift signal is detected, the D/R-range hold time being a time during which the shift range is held at said one of the D- and R-ranges, to determine a drive compensated piston ratio; and calculating a fill time using the compensated piston stroke ratio; said drive compensating further comprising, detecting the D/R to N shift signal, initializing, in the case where the D/R to N shift signal is detected, a timing device after the D/R-range hold time is detected, calculating a change in a D/R to N piston stroke ratio from the pre-installed map using the D/R-range hold time, and compensating the piston stroke ratio based on the change in the D/R to N piston stroke ratio.

4. The method of claim 3 wherein the piston stroke ratio is compensated by adding the change in the D/R to N piston stroke ratio to the piston stroke ratio.

5. A method for determining, using a piston stroke ratio of a piston, a fill time for a friction element in an automatic transmission that is either engaged or disengaged during shifting between an N-range, a D-range, and an R-range, the friction element being actuated by the piston, the method comprising:

determining a neutral compensating for the piston stroke ratio of said piston;

determining a drive compensating for the piston stroke ratio of said piston;

detecting a compensation start signal of the piston stroke ratio;

initializing the piston stroke ratio and a timing device;

calculating a fill time for said piston using either the determined neutral compensating or drive compensating for the piston stroke ratio of said piston; and repeating the neutral compensating, drive compensating, and calculating of the fill time until shifting occurs into a shift range other than the R-, N-, and D-ranges.

6. The method of claim 5, wherein the compensation start signal of the piston stroke ratio is a D/R to N shift signal indicating shifting into the N-range from one of the D-range and the R-range, initialization of the timing device is such that the timing device is initialized to 0, and initialization of the piston stroke ratio is such that the piston stroke ratio is initialized to 1 in the case of a friction element that is disengaged during shifting into the N-range and to 0 in the case of a friction element that is engaged during shifting into the N-range.

7. The method of claim 5, wherein the fill time is calculated using the equation "fill time=(1- St)*Th", where St is the piston stroke ratio and Th is a predetermined standard fill time.

8. The method of claim 5, wherein the fill time is calculated based on the piston stroke ratio and using an inverse map of the pre-installed map.

9. A system for determining a fill time of friction elements of an automatic transmission comprising:

a shift lever detector for detecting a position of a shift lever, which is operated by a driver, and outputting a corresponding shift lever change signal;

a timing device for measuring time intervals between a change in position of the shift lever, and outputting a corresponding time signal; and an electronic control unit for calculating a friction element fill time when the shift lever change signal is input in which the friction element fill time is calculated based on a piston stroke ratio of a piston that drives a friction element, wherein the electronic control unit compensates the piston stroke ratio by detecting an N-range hold time and by using the detected N-range hold time and a pre-installed map when an N to D/R shift signal indicating shifting into one of the D- and R-ranges from the N-range is detected, compensates the piston stroke ratio by detecting a D/R-range hold time and using the detected D/R-range hold time and the pre-installed map when a D/R to N shift signal indicating shifting into the N-range from one of the D- and R-ranges is detected, the D/R-range hold time being a time during which the shift range is held at said one of the D- and R-ranges, and calculates a fill time using the compensated piston stroke ratio; and wherein in the compensation of the piston stroke ratio using the N-range hold time and the pre-installed map, it is determined if the N to D/R shift signal is detected, the timing device is initialized after the N-range hold time is detected in the case where the N to D/R shift signal is detected, a change in an N to D/R piston stroke ratio is calculated from the pre-installed map using the N-range hold time, and the piston stroke ratio is compensated based on the change in the N D/R piston stroke ratio.

10. A system for determining a fill time of friction elements of an automatic transmission comprising:

a shift lever detector for detecting a position of a shift lever, which is operated by a driver, and outputting a corresponding shift lever change signal;

a timing device for measuring time intervals between a change in position of the shift lever, and outputting a corresponding time signal; and an electronic control unit for calculating a friction element fill time when the shift lever change signal is input in which the friction element fill time is calculated based on a piston stroke ratio of a piston that drives a friction element, wherein the electronic control unit compensates the piston stroke ratio by detecting an N-range hold time and by using the detected N-range hold time and a pre-installed map when an N to D/R shift signal indicating shifting into one of the D- and R-ranges from the N-range is detected, compensates the piston stroke ratio by detecting a D/R-range hold time and using the detected D/R-range hold time and the pre-installed map when a D/R to N shift signal indicating shifting into the N-range from one of the D- and R-ranges is detected, the D/R-range hold time being a time during which the shift range is held at said one of the D- and R-ranges, and calculates a fill time using the compensated piston stroke ratio; and wherein in the compensation of the piston stroke ratio using the D/R-range hold time, it is determined if the D/R to N shift signal is detected, the timing device is initialized after the D/R-range hold time is detected in the case where the D/R to N shift signal is detected, a change in a D/R to N piston stroke ratio is calculated from the pre-installed map using the D/R-range hold time, and the piston stroke ratio is compensated based on the change in the D/R to N piston stroke ratio.

11. A system for determining a fill time of friction elements of an automatic transmission comprising:

a shift lever detector for detecting a position of a shift lever, which is operated by a driver, and outputting a corresponding shift lever change signal;

a timing device for measuring time intervals between a change in position of the shift lever, and outputting a corresponding time signal; and an electronic control unit for calculating a friction element fill time when the shift lever change signal is input in which the friction element fill time is calculated based on a piston stroke ratio of a piston that drives a friction element, wherein the electronic control unit compensates the piston stroke ratio by detecting an N-range hold time and by using the detected N-range hold time and a pre-installed map when an N to D/R shift signal indicating shifting into one of the D- and R-ranges from the N-range is detected, compensates the piston stroke ratio by detecting a D/R-range hold time and using the detected D/R-range hold time and the pre-installed map when a D/R to N shift signal indicating shifting into the N-range from one of the D- and R-ranges is detected, the D/R-range hold time being a time during which the shift range is held at said one of the D- and R-ranges, and calculates a fill time using the compensated piston stroke ratio; and wherein the processes of detecting a shift signal, compensating the piston stroke ratio, and calculating the fill time are repeated until shifting occurs into a shift range other than the R-, N-, and D-ranges.

12. The system of claim 11, wherein the fill time is calculated using the equation "fill time=(1- St)*Th", where St is the piston stroke ratio and Th is a predetermined standard fill time.

13. The system of claim 11, wherein the fill time is calculated based on the piston stroke ratio and using an inverse map of the pre-installed map.

14. A system for determining a fill time for friction elements in an automatic transmission, the friction elements being actuated by hydraulic pistons, the pistons having at any given time a present stroke and a stroke ratio, the system comprising:

a shift lever detector adapted to monitor a driver operated transmission shift lever and generate a shift lever change signal in response to movement of the shift lever between gears;

a timer adapted to generate a time signal; and a control unit including a processor communicating with said shift lever detector and timer to receive said generated signals, wherein the processor is programmed to (a) initialize the timer and present stroke;

(b) detect a N to D/R shift or a D/R to N shift based on signals generated by the shift level detector, and, in response to a detected N to D/R shift execute a first set of instructions, or in response to a detected D/R to N shift execute a second set of instructions, wherein the first set of instructions comprises detecting a N-range hold time and initializing the timer, calculating a change in the N to D/R stroke ratio, compensating for the change in said N to D/R stroke ratio, and calculating a fill time based on the compensated N to D/R stroke ratio;

the second set of instructions comprises detecting a D/R range hold time and initializing the timer, calculating a change in the D/R to N stroke ratio, compensating for the change in said D/R to N stroke ratio, and calculating a fill time based on the compensated D/R to N stroke ratio;

wherein said processor further includes at least one data map of related times and piston stroke ratios corresponding to each detectable change in shift lever position; and the change in stroke ratio is calculated based on the detected hold time and related stroke ratio from said data maps.

15. The system according to claim 14, wherein said compensating instruction comprises instructions to add the change in stroke ratio to the present stroke ratio.

16. The system according to claim 15, wherein said calculating fill time instruction comprises multiplying a standard fill time times one minus the present stroke ratio.

* * * * *